United States Patent
Ilch et al.

(10) Patent No.: US 7,052,387 B2
(45) Date of Patent: May 30, 2006

(54) APPARATUS FOR PORTIONING A PIECE OF FOOD

(75) Inventors: Hartmut Ilch, Kehl (DE); Joachin Schill, Kehl (DE)

(73) Assignee: MAJA-Maschinenfabrik Hermann Schill GmbH & Co. KG, Kehl-Goldscheuer (DE)

( * ) Notice: Subject to any disclaimer, the term of this patent is extended or adjusted under 35 U.S.C. 154(b) by 0 days.

(21) Appl. No.: 10/773,013

(22) Filed: Feb. 5, 2004

(65) Prior Publication Data

US 2004/0156965 A1   Aug. 12, 2004

(30) Foreign Application Priority Data

Feb. 5, 2003   (DE) .............................. 103 04 773

(51) Int. Cl.
*A22C 25/14* (2006.01)

(52) U.S. Cl. .................................................. 452/155

(58) Field of Classification Search .............. 452/2, 452/3, 5, 169, 166, 170, 155–157
See application file for complete search history.

(56) References Cited

U.S. PATENT DOCUMENTS

| | | | |
|---|---|---|---|
| 4,272,862 A * | 6/1981 | Griffin et al. ............... | 452/127 |
| 5,496,210 A * | 3/1996 | Davis .......................... | 452/169 |
| 5,569,065 A * | 10/1996 | Sawyer et al. ................. | 452/3 |
| 5,733,184 A * | 3/1998 | Curry et al. ................. | 452/138 |
| 6,824,460 B1 * | 11/2004 | Young et al. ................. | 452/83 |

FOREIGN PATENT DOCUMENTS

| | | |
|---|---|---|
| DE | 2730843 | 1/1979 |
| DE | 4108605 | 7/1992 |
| DE | 4108605 | 2/1999 |
| DE | 19921047 | 11/2000 |
| DE | 19938051 | 2/2001 |

OTHER PUBLICATIONS

Document No. 29513043, Patent Date Nov. 30, 1995 in Germany.
Document No. 1394215, Patent Date Feb. 10, 1964 in France.

* cited by examiner

*Primary Examiner*—Thomas Price
(74) *Attorney, Agent, or Firm*—Orum & Roth LLC

(57) ABSTRACT

A device and procedure for portioning a piece of food in portions with a predetermined weight or predetermined thickness. The device has a pivotable insertion drum (1) arranged in a rotatable manner around its axis with at least one oblong insertion chamber (4) for inserting the piece of food. A knife (3) is arranged on the insertion drum (1) for cutting a portion located in the portioning chamber from the rest of the piece of food.

18 Claims, 4 Drawing Sheets

APPARATUS FOR PORTIONING A PIECE OF FOOD

Figure 1:
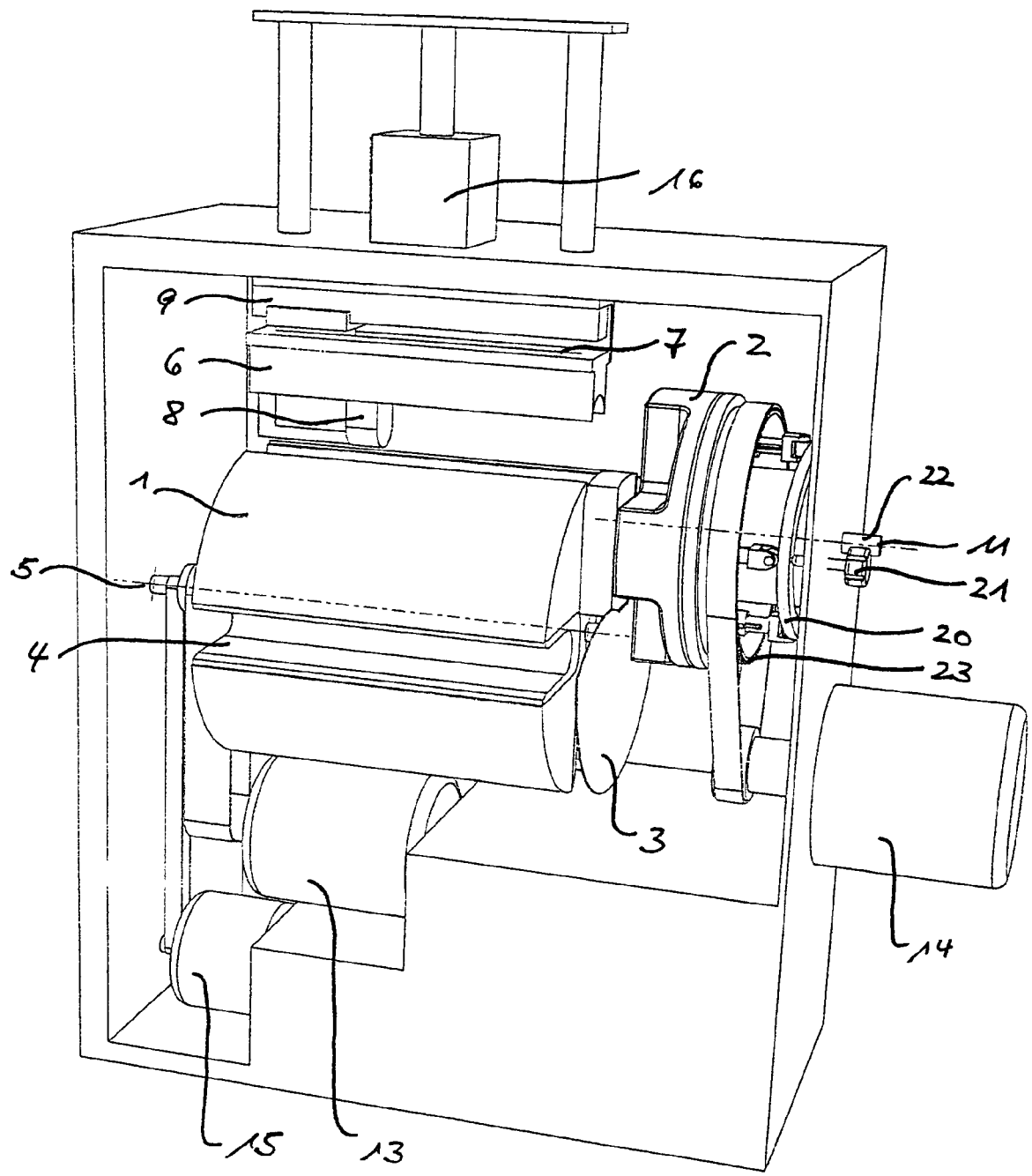

This application claims priority to German Application 10304773, filed Feb. 5, 2003.

STATE OF THE ART

The invention originates from a device and a process for portioning a piece of food in accordance with the preamble of claim 1 and claim 19.

Such devices are used to cut food into portions or slices of the same weight or the same thickness. The food, for example, includes fresh meat, sausage, ham, cheese, vegetables, or baked goods. Known devices for cutting sausage or cheese are also called slicers.

Portioning devices for fresh meat are, for example, used in canteen kitchens and in the production of prepackaged meals. Individual portions, in particular quick fried pieces like schnitzel, steak, or medaillons are cut from a piece of fresh meat or other piece of food. It is thus important that the individual portions have a predetermined weight and, if need be, a predetermined thickness. The slices must be portioned as exactly as possible so that they correspond in their cooking time, so that the individual portions do not differ from each other too much, and so that the weight can be given on preprinted packaging.

From the state of the art of DE 197 35 597 A1, a device for portioning a piece of meat is known in which the piece of meat is compressed in an insertion drum with the help of a pressure ram and depressed into a portioning chamber. The entire portioning chamber is thereby filled up with meat. Then the portion located in the portioning chamber is cut off the piece of meat with the help of a knife, and the portion is removed from the portioning chamber. For this, the portioning chamber is pivoted or shifted from an initial position as an extension of the insertion chamber into an ejection position. This process is repeated until the entire piece of meat is cut up into equal portions. This state of the art has proven to be disadvantageous in that the number of portions cut off per time unit is low. Thus, the portioning chamber can only be refilled once the cut-off portion is removed from the portioning chamber. Moreover, the insertion chamber can only be filled with a second piece of food once the first piece of food is completely cut up into portions and the pressure ram is returned to its initial position. The portioning device stops during the refilling of the insertion chamber. However, quick portioning is required in food processing, since the separated portions must often be further processed by additional machines. For example, cut-off portions of meat are breaded. If the breading process occurs faster than the portioning, then the entire process of meat processing is delayed by the portioning.

Moreover, the known device has the disadvantage of being large in size. For safety reasons, the housing surrounding the device must be designed in such a way that it encloses the shifting pressure ram and the pivotable or shiftable portioning chamber in all positions. Even if the housing does not meet this requirement, the paths of movement of the device parts must be taken into consideration during positioning. In any case, the device requires a lot of space.

THE INVENTION AND ITS ADVANTAGES

In comparison, the device in accordance with the invention with the characteristics of claim 1 has the advantage that a rotatable insertion drum is provided. The insertion drum thereby contains one or more insertion chambers. A first insertion chamber of the insertion drum can be filled with a piece of food, while a piece of food located in a second insertion chamber is portioned. As soon as the piece of food in the second insertion chamber is completely cut up into portions, the portioning of the piece of food in the first insertion chamber can begin. Thus, long device standstill periods during the filling with another piece of food are avoided.

The insertion chambers can run parallel to each other and to the axis of the insertion chamber. Moreover, there is the option of having the insertion chambers run at an angle to each other and to the axis of the insertion drum. The insertion chambers can be arranged in the insertion drum so that a long side runs in the axial direction along the perimeter of the cylindrical insertion drum. This long side is open on the outside so that a piece of food can be inserted. If the filling of the insertion chamber is complete, then the open long side is closed by a cover. The cover contains a guide for the piston. According to requirements, either a cover can be provided with a guide for all insertion chambers or several covers can be arranged with a guide on the insertion drum.

According to an advantageous embodiment of the invention, a portioning drum arranged such that it can be rotated around its axis is provided on the end of the insertion drum that is turned away from the piston and contains one or more portioning chambers. Such portioning chambers are required in particular for exact portioning of fresh meat by weight. They ensure that the portion to be cut off the piece of food has an exact predetermined volume and thus an exact predetermined weight. Since the portioning drum has several portioning chambers, several processes can take place at the same time. Thus, for example, the cut-off portion from one of the portioning chambers can be removed, while another portioning chamber is already being filled with meat again. For this, the portioning drum is turned at an angle after the portion is cut off by the knife. Thus, there is an empty portioning chamber on the insertion chamber filled with meat as soon as the knife is turned or shifted and the infeed of meat from the insertion chamber into the empty portioning chamber is enabled. The portioning chamber containing the cut-off portion is brought into a position by the turning of the portioning drum that allows the portioning chamber to be accessible from the outside. In this position, the cut-off portion can be ejected and removed.

The portioning chambers can be arranged in the portioning drum at the same or different angular separations. During a rotation of the portioning drum around these angular separations, a still empty portioning chamber is positioned on a filled insertion chamber. At the same time, a portioning chamber with a cut-off portion is transferred into a position, in which the cut-off portion can be ejected.

The cross-section of the insertion chambers closed on the long side is either identical to the cross-section of the portioning chambers or slightly smaller so that the piece of meat can be fed into the portioning chamber unimpeded by the insertion chamber.

The device in accordance with the invention has the advantage of being small and compact in size. During operation, insertion drums, portioning drums and knives are merely rotated. Thus, they require no or very little space beyond their construction dimensions. The piston serving to compress the piece of food in the insertion chamber is advantageously moved via a guide and a drive system, which are located on the side of the insertion drum. A pressure ram, which is driven via a connecting rod or plate protruding from the insertion chamber and thus requiring additional room for shifting, is, in contrast to the state of the art, not provided.

The axis of the portioning drum can run coaxial or at an angle to the axis of the insertion drum. It should be noted that the portioning chamber is positioned in the portioning drum so that a portioning chamber is transferred from an initial position as an extension of the insertion chamber into a second position for the ejection of the cut-off portion by turning the portioning drum.

In accordance with another advantageous embodiment of the invention, the portioning chambers have a chamber floor arranged in a movable manner on the side turned away from the insertion drum. A mechanical gear unit, an electromotor, pneumatic or hydraulic power unit, is provided for setting the chamber floor. The depth of the portioning chamber and thus the volume can be set with the chamber floor. In this manner, portions with various thicknesses and volumes can be set with the device in accordance with the invention. In the case that the cross-section of the portions also needs to be varied, the insertion chambers and the portioning chambers must be variable with respect to their cross-section. The chambers can be designed as inserts that can be inserted into the provided shafts of the drums. Moreover, it can be arranged that the insertion drums and the portioning drums can be replaced by other drums with a different chamber cross-section.

In accordance with another advantageous embodiment of the invention, a second gear unit or a second power unit is provided that shifts the chamber floor immediately after the cutting off of the portion. After the knife has cut off the portion and the portioning chamber closes, the chamber floor is then moved in a direction so that it is removed from the knife. The volume of the portioning chamber is thereby increased, and the knife is released. During the subsequent rotation of the portioning drum, the piece located in the portioning chamber experiences no strong frictional force and thus its surface is not damaged. If the portioning chamber is located in the ejection position, then the chamber floor is shifted in the opposite direction so that the volume of the portioning chamber is decreased. The portion is thereby ejected from the portioning chamber.

In accordance with another advantageous embodiment of the invention, channels are provided in the chamber floor of the portioning chambers for supplying and removing air. The portioning drum is equipped with a media supply tube, into which the channels flow. In order to support the filling of the portioning chambers with the piece of food, the air in the portioning chamber is extracted, thereby creating negative pressure. This can rule out that the portioning chamber is not completed filled with the piece of food, which can cause deviations with respect to the volume of the individual portions. The ejection of a cut-off portion from the portioning chamber is supported by the supply of air. Through the effect of air pressure, the cut-off portion is pressed out of the portioning chamber. The portion is thereby detached from the chamber floor without remains remaining in portioning chamber. Such remains should be avoided, as they lead to the contamination of the portioning chamber on one hand and to deviations in the volume of the individual portions on the other hand.

In accordance with another advantageous embodiment of the invention, the knife in a first position releases a portioning chamber of the portioning drum, in order to press the piece of food over the piston and into the portioning chamber. If the portioning chamber is completely full, then the knife is turned at an angle $\alpha$ with $\alpha$ less than 360° for cutting the portion located in the portioning chamber from the piece of food. Now the knife closes the end of the insertion chamber that is turned away from the piston so that the piece of food cannot be moved. The portioning drum turns at an angle $\beta$. Only when the portioning drum is turned at angle $\beta$ and there is an empty portioning chamber as an extension of the insertion chamber does the knife release the insertion chamber so that the piece of food can be pushed forward over the piston and into the portioning chamber. Through this course of events, friction is minimized between the knife and the cut surface of the piece of food as well as the cut surface of the cut-off portion. Moreover, the cycle time is also minimized.

Through a suitable design of the geometry of the knife and suitable control of the rotation of the portioning drum and the knife, it is possible to provide the portions with a butterfly cut or to cut off several portions in different portioning chambers with a rotation of the knife.

In accordance with another advantageous embodiment of the invention, the cutting edge of the knife has a curved gradient so that the piece of food is cut into two during the rotation of the knife by a pulling cut. Not only pieces of food but also pieces of fresh meat can thus be portioned.

In accordance with another advantageous embodiment of the invention, the rotatable knife has the form of a section of a circle with a central angle between 200° and 300°.

In accordance with another advantageous embodiment of the invention, the knife is provided with a power unit, which pushes the knife forward in one direction and retracts. The cutting edge of the knife runs at an angle against the movement direction, like with a guillotine, so that the piece of food can be cut into two with a pulling cut.

The procedure in accordance with the invention ensures that the portioning process takes place quickly and in an unproblematic manner. In particular, the transport and the ejection of the cut-off portion are accelerated and simplified.

Additional advantages and advantageous embodiments of the invention can be found in the following description, the drawing and the claims.

DRAWING

An embodiment of the invention is shown in the drawing:
FIG. 1 A foreshortened view of a device for portioning with an open insertion chamber
FIG. 2 A section of a device in accordance with FIG. 1
FIG. 3 A back view of a device in accordance with FIG. 1 and FIG. 2
FIG. 4 A smaller-scale section of a device in accordance with FIG. 2
FIG. 5 A cut through the device in accordance with FIG. 2 at the location marked with A—A in FIG. 2
FIG. 6 A cut through the device in accordance with FIG. 4 at the location marked with B—B in FIG. 2

DESCRIPTION OF THE EMBODIMENT

Figure 2:
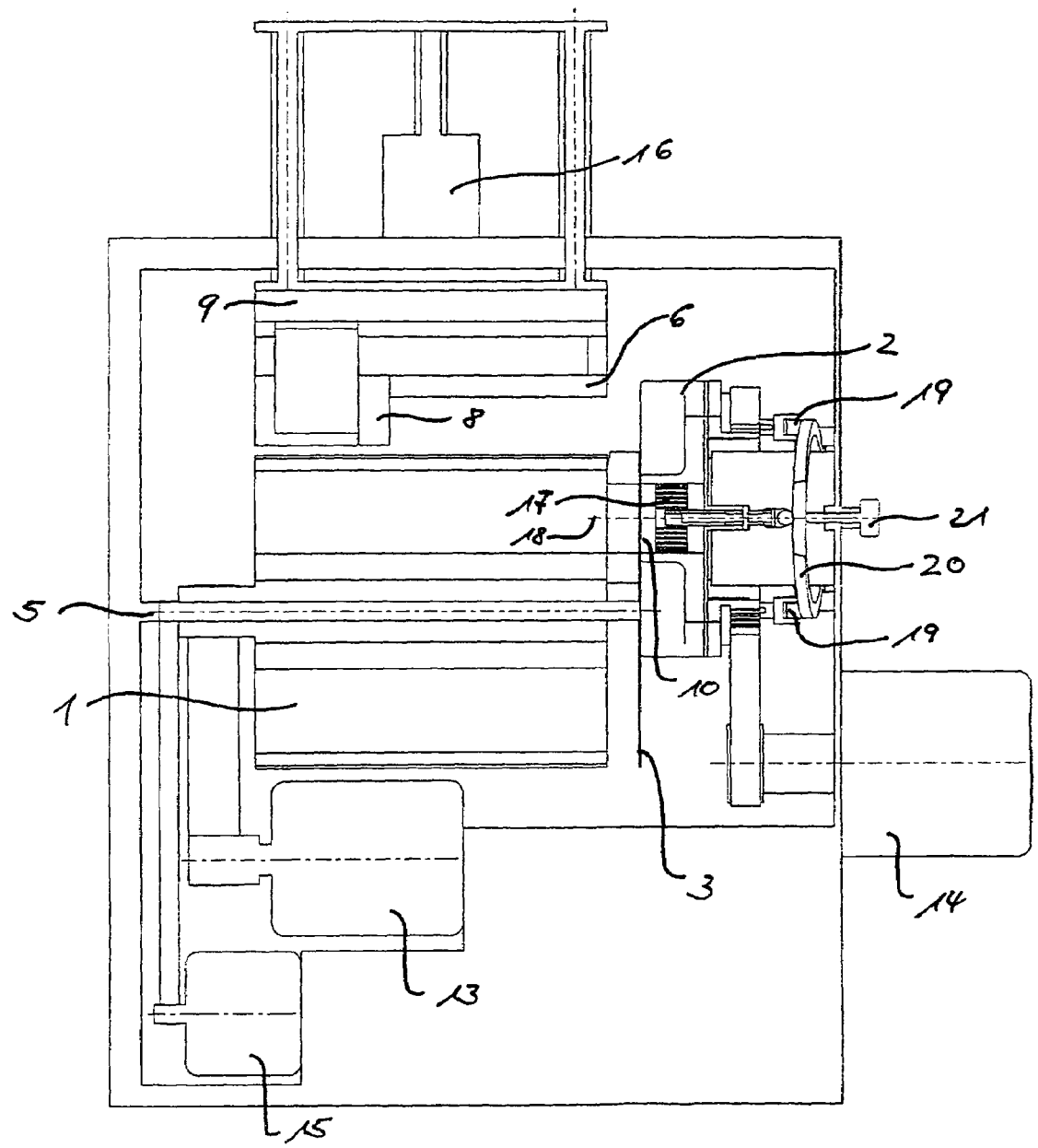
Figure 3:
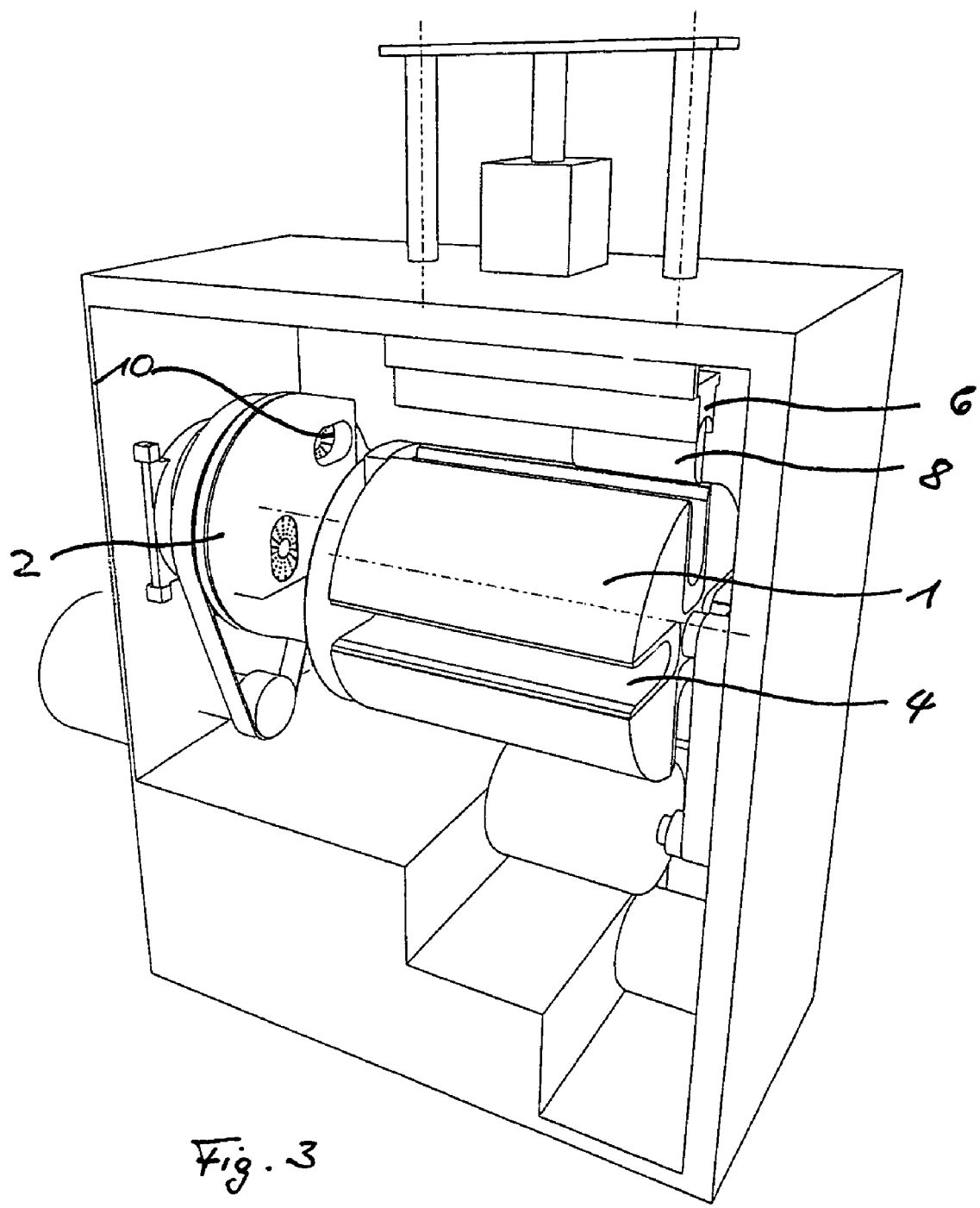

FIGS. 1, 2 and 3 show a device for portioning fresh meat with an insertion drum 1, a portioning drum 2 and a knife 3. The insertion drum 1 has the form of a cylinder and has four insertion chambers 4, two of which can be seen in FIG. 1. The insertion chambers 4 are arranged parallel to each other and to axis 5 of the insertion drum 1. A long side thereby runs in the axial direction along the perimeter of the cylindrical insertion drum 1. This long side is open on the outside and is closed by a cover 6. The cover contains a guide 7 for the piston 8. The piston is moved gradually or continuously via the power unit 9. It is also located on the cover 6. The piston 6 is moved in the axial direction via the power unit 9 and the guide 7. A force is thereby exerted on a piece of meat inserted into the insertion chamber 4, which ensures that the meat completely fills the space available in the insertion chamber 4 closed by the cover 6 and is pushed forward in the direction of the portioning drum 2. In order to press the meat even before the start of the portioning process and to prevent the meat being folded by the force of the piston in the axial direction, the meat is pressed into the insertion chamber by the cover 6. The piece of meat is thus subjected to forces from several directions in the insertion chamber.

The insertion chambers 4 are designed as an insert that can be inserted in provided shafts on the insertion drum 1. Thus, the insertion chambers can be replaced by ones with a different cross-section.

A piston 8 and a cover 6 with guide 7 and power unit 9 are provided on the insertion drum 1 for all insertion chambers 4. Piston 8 and cover 6 are located on the insertion chamber 4 that contains the piece of meat to be portioned.

Four portioning chambers 10 are provided in the portioning drum 2, two of which can be seen in FIG. 3. The cross-section of the portioning chamber 10 is slightly larger than the cross-section of the insertion chambers 4 close by the cover 6 on their long sides. This is a long cross-section with curvatures. The axis 11 of the portioning drum 2 runs parallel to the axis 5 of the insertion drum 1.

The knife 3 is arranged in a rotatable manner between the insertion drum 1 and the portioning drum 2. The axis of the disc-like knife 3 and the axis 5 of the insertion drum 1 thereby run coaxially. The geometry of the knife 3 is approximated to a section of a circle. The cutting edge 12 of the knife 3 has a curved gradient and is convex compared to the rest of the surface of the knife. If one were to increase the length of the cutting edge, a spiral would be created.

The rotation of insertion drum 1 is driven by the power unit 13; the portioning drum 2, by the power unit 14; and the knife 3, by the power unit 15. The power unit 16 ensures that the cover 6 with the piston 8 is moved onto and away from the insertion chamber.

Figure 6:
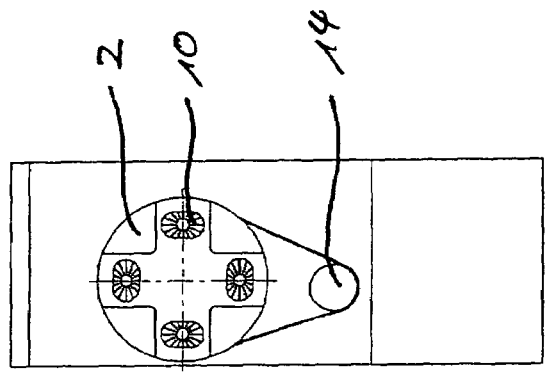
Figure 4:
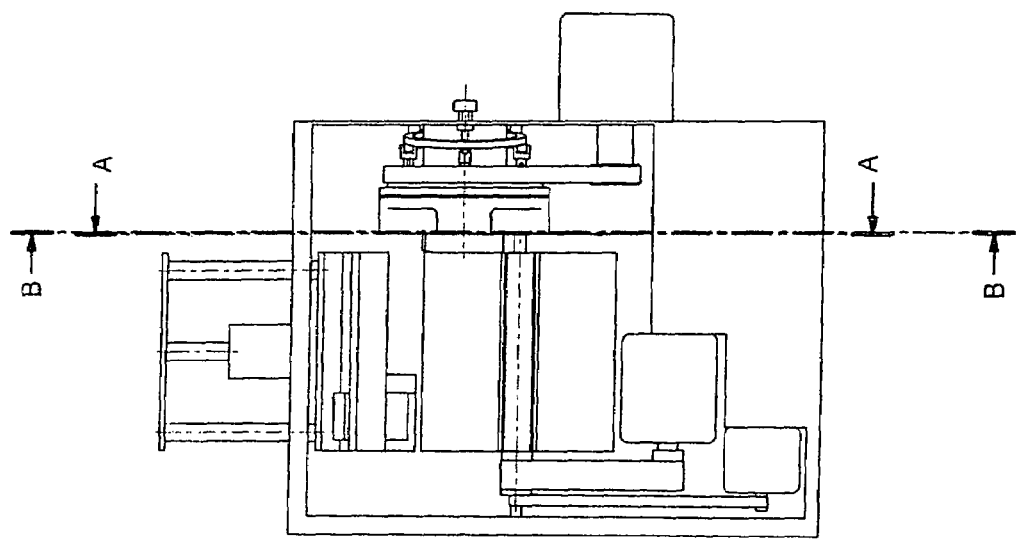
Figure 5:
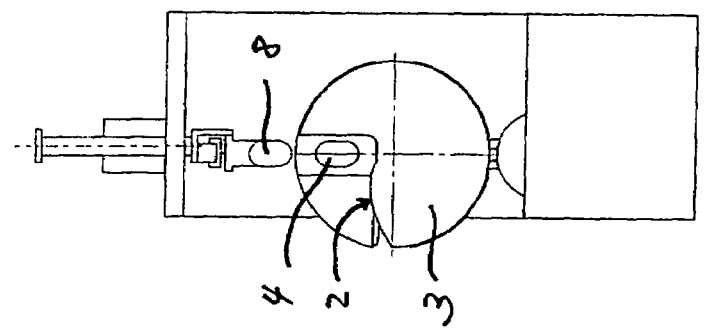

FIG. 2 and FIG. 4 show a longitudinal section through the device. The FIGS. 5 and 6 show a cross-section at the location marked with A—A and B—B. The portion chambers 10 are equipped with a chamber floor 17 that can be shifted using a gear unit. The chamber floor is connected with an axis 18, which touches a cam disc 20 via track rollers 19. The setting of the chamber floor 17 takes place manually using the adjusting screw 21, which also touches the cam disc 20.

A media supply tube 22 is connected with channels (not shown in the drawing) in the chamber floors 17 of the portioning chambers 10. Air pressure is supplied to the portioning chambers or air is removed to create negative pressure via this media supply tube 22.

The drive wheel 23 serves to power the rotation of the portioning drum 2. The power unit 14 of the portioning drum 2, the power unit 15 of the knife 3 and, if need be, the power unit 9 of the piston 8 must be timed appropriately, in order to guarantee the flow of the portioning. A control not shown in the drawing is provided for this purpose. The powering of the insertion drum can take place manually or via a motor. The powering or the positioning of the insertion drum is also realized by the control system.

For portioning a piece of meat, this is inserted into the insertion chamber 4 of the insertion drum 1, which is shown in the plane of projection of FIG. 1. Then the insertion chamber is rotated backwards, so that it is arranged directly on the cover 6 with the piston 8. Then the insertion chamber with the cover 6 is closed. In this process, the piece of meat is compressed along its long side by the cover 6. Now a force is exerted via the piston 8 that pushes the piece in the direction of the portioning drum 2. A portioning chamber 10, into which the piece of meat is pushed until the entire volume of the portioning chamber 10 is filled with the meat, is located in the extension of insertion chamber 4. This procedure is supported by negative pressure in the portioning chamber. Now the knife 3 is rotated and thereby cuts the portion located in the portioning chamber 10 off the remaining piece of meat through a pulling cut. Now the knife 3 closes the end of the insertion chamber turned away from the piston so that the piece of meat cannot be pushed forward. The portioning drum rotates at a 90° angle. Only when the portioning drum 2 has been rotated 90° and there is an empty portioning chamber 10 as an extension of the insertion chamber 4 does the knife 3 release the insertion chamber 1 so that the piece of meat can be pushed forward over piston 8 into the portioning chamber 10. This process is supported by excess pressure in the portioning chamber and by a shifting of the chamber floor. Immediately after the portion located in the portioning chamber 10 is cut from the piece of meat by the knife and the knife closes the portioning chamber in the direction of the insertion chamber, the chamber floor is shifted so that the volume of the portioning chamber 10 is slightly increased. This releases the knife. Lower frictional forces occur between the cut-off portion and the knife during the rotation of the portioning drum and surface of the portion is not lacerated. As soon as the portioning chamber in located in the ejection position, the chamber floor 17 is moved in the opposite direction so that the volume of the portioning chamber is decreased. This supports the ejection of the portion from the portioning chamber. The adjustment of the chamber floor 17 during the transport and the ejection of the cut-off portion is effectuated by the cam disc 20. This is narrower in the section seen in FIGS. 2 and 4 than in the opposite section, not shown in the drawing. The chamber-floor 17 position set by the adjusting screw 21 is locked only during the conveying of the meat into the portioning chamber 10.

These steps are repeated until the entire piece of meat is cut up into portions. A piece of meat can simultaneously be inserted into another insertion chamber 4 of the insertion drum 1 and is cut off immediately after the portioning of the first piece of meat into portions is finished. The transport of the cut-off portions of meat can take place, for example, via a transport band. The insertion chambers can be filled manually or automatically.

All characteristics of the invention can be integral to the invention individually as well as in any combination.

REFERENCE NUMBERS

1 Insertion Drum
2 Portioning Drum
3 Knife
4 Insertion Chamber
5 Axis of the Insertion Drum
6 Cover
7 Guide
8 Piston
9 Power Unit of the Piston
10 Portioning Chamber
11 Axis of the Portioning Drum
12 Cutting Edge of the Knife
13 Power Unit of the Insertion Drum 14 Power Unit of the Portioning Drum
15 Power Unit of the Knife
16 Power Unit of the Cover
17 Chamber Floor
18 Axis of the Chamber Floor
19 Track Roller
20 Cam Disc
21 Adjusting Screw
22 Media Supply Tube
23 Drive Wheel

The invention claimed is:

1. Device for the portioning of a piece of food into portions with a predetermined weight or a predetermined thickness, comprising:
    at least one oblong insertion chamber (4) for the insertion of the piece of food,
    a piston (8) that can be inserted axially from one end into the insertion chamber (4) for the compression of the piece of food in the insertion chamber and for the gradual or continuous axial infeed,
    with a knife (3) arranged in a movable manner on the insertion chamber (4) for cutting the portion protruding from the insertion chamber from the piece of food, and
    an insertion drum arranged in such a manner that it can be rotated around its axis (5) and the insertion chamber (4) or several insertion chambers (4) are part of the insertion drum (1).

2. Portioning device in accordance with claim 1, further comprising several insertion chambers (4), which run parallel to each other and to the axis (5) of the insertion drum or at an angle to each other and to the axis of the insertion drum, in the insertion drum (1).

3. Device in accordance with claim 1, wherein the end of the insertion chamber (4) turned away from the piston (8) is provided with a portioning drum (2) arranged in a rotatable manner around its axis (11) that contains one or more portioning chambers (10) and
    in that the knife (2) for cutting the portion located in the portioning chamber (10) from the piece of food is provided between the insertion drum (1) and the portioning drum (2).

4. Portioning device in accordance with claim 3, wherein the axis (11) of the portioning drum (2) runs coaxial, parallel or at an angle to the axis (5) of the insertion drum (1).

5. Portioning device in accordance with claim 4, further comprising a second mechanical gear unit or a second electromotor, pneumatic or hydraulic power unit that moves the chamber floor in the first direction turned away from the knife after the completion of the cutting procedure, in order to release the knife.

6. Portioning device in accordance with claim 5, wherein the second gear unit or the second power unit is provided in order to move the moveable chamber floor of the portioning chamber in the opposite second direction and to eject the portion from the portioning chamber.

7. Portioning device in accordance with claim 5, wherein the second gear unit or the second power unit is part of the first gear unit or the first power unit.

8. Portioning device in accordance with claim 3, further comprising the channels for supplying and removing air in a chamber floor (17) of the portioning chambers (10) and in that the portioning drum (2) is equipped with a media supply tub (22) into which the channels flow.

9. Portioning device in accordance with claim 3, further comprising a rotation drive for both the portioning drum and the knife.

10. Portioning device in accordance with claim 3, wherein the knife (3) in a first position releases a portioning chamber (10) of the portioning drum (2) in order to press the piece of food over the piston (8) and into the portioning chamber (8) and in that the knife (3) locks the insertion chamber (4) in a second position after the cutting of the portion located in the portioning chamber (10).

11. Portioning device in accordance with claim 3, further comprising a first mechanical gear unit or a first electromotor, pneumatic or hydraulic power unit for the setting of a chamber floor (17) of the portioning chamber,
    the chamber floor arranged on the side turned away from the insertion drum.

12. Portioning device in accordance with claim 11, further comprising a curve profile (20), an adjusting screw (21) touching the curve profile, and a track roller (19) adapted to transfer movement of the curve profile to the chamber floor for the manual or automatic setting of the position of the chamber floor (17).

13. Portioning device in accordance with claim 1, further comprising a feed (7) and a power unit (9) on the side of the insertion drum (1) for the movement of the piston (8).

14. Portioning device in accordance with claim 1, wherein the knife (3) is arranged in a rotatable manner around an axis on the insertion drum or between the insertion drum (1) and the portioning drum (2), whereby the axis runs parallel or coaxial to the axis (5) of the insertion drum (1).

15. Portioning device in accordance with claim 1, wherein the knife (3) has a cutting edge (12) with a curved gradient.

16. Portioning device in accordance with claim 14, wherein the knife (3) is disc-like and has the form of a section of a circle, whereby the central angle is between 200° and 300°.

17. Portioning device in accordance with claim 1, further comprising a knife gate on or in the insertion chamber for the cutting of cubes.

18. Portioning device in accordance with claim 1, further comprising a power unit for the knife adapted to push and retract the knife in a direction, and the knife has a cutting edge that runs at an angle against the knife's direction of motion.

* * * * *